United States Patent [19]
Welin

[11] 3,938,103
[45] Feb. 10, 1976

[54] INHERENTLY MICRO PROGRAMMABLE HIGH LEVEL LANGUAGE PROCESSOR

[76] Inventor: Andrew M. Welin, Rte. 1, Waldo, Ohio 43356

[22] Filed: Mar. 20, 1974

[21] Appl. No.: 452,819

[52] U.S. Cl. .......................................... 340/172.5
[51] Int. Cl.² .................................... G06F 7/00
[58] Field of Search .................. 340/172.5; 444/1

[56] References Cited
UNITED STATES PATENTS

| | | | |
|---|---|---|---|
| 3,215,987 | 11/1965 | Terzian | 340/172.5 |
| 3,268,871 | 8/1966 | Handler et al. | 340/172.5 |
| 3,268,872 | 8/1966 | Kimlinger | 340/172.5 |
| 3,300,764 | 1/1967 | Doelz et al. | 340/172.5 |
| 3,302,183 | 1/1967 | Bennett et al. | 340/172.5 |
| 3,391,394 | 7/1968 | Ottaway et al. | 340/172.5 |
| 3,478,322 | 11/1969 | Evans | 340/172.5 |
| 3,646,522 | 2/1972 | Furman et al. | 340/172.5 |
| 3,736,567 | 5/1973 | Lotan et al. | 340/172.5 |
| 3,748,649 | 7/1973 | McEdwen et al. | 340/172.5 |

*Primary Examiner*—Raulfe B. Zache
*Attorney, Agent, or Firm*—Johnson, Dienner, Emrich & Wagner

[57] ABSTRACT

An inherently micro programmable high level language processor and a micro programming language which permits the micro programmer to program in terms of constructs related to the process of interpretation is disclosed. Such constructs include, but are not limited to, character extraction and stack manipulation. A method of interpretation which embodies the methods of sequential extraction and linear decoding at the micro programming level is also presented.

25 Claims, 5 Drawing Figures

INHERENTLY MICRO PROGRAMMABLE HIGH LEVEL LANGUAGE PROCESSOR

BACKGROUND OF THE INVENTION

1. Field of the Invention

The invention relates to the operation of digital computers, and more particularly to apparatus and methods comprising a general purpose computer designed to support the process of interpreting arbitrary machine languages.

2. Description of the Prior Art

A data processing system usually includes a processor unit which executes instructions that are stored in a memory. These instructions are transferred to the processor unit sequentially under the control of a program counter. The processor must interpret each instruction that is passed to it, and direct the machine through a series of operations which correspond to executing the instruction.

According to the prior art, the interpretation of machine language programs is typically performed by a micro programmed processor. The concept of micro programming for performing interpretation is well known to those skilled in the digital processing field. However, for the sake of clarity and comparison, a basic explanation of micro programming will first be presented.

In the early 1950's M. V. Wilkes (See "The Best Way To Design An Automatic Calculating Machine," Manchester University Inaugural Conference, July, 1951, pp. 16-18) proposed a computer which would have a variable instruction set. Normally a fixed set of instructions is available to the programmer, each instruction being made up of a succession of processing steps. The implementation of these steps constitutes the design of most of the machines. What Wilkes proposed was to replace rigid hardwired processing steps with a flexible means by which a programmer could assemble so-called "micro operations" into any instruction. A micro operation is a low level instruction which when executed results in a processing step. Micro operations may be utilized to alter a machines instruction repertoire from day to day as its applications vary. This was the origin of the idea of micro programming.

Micro programming provides a powerful means of controlling the hardware resources of a machine during each machine cycle. In particular, micro programs allow close control of hardware (register) level data manipulation. However, micro programmed computers are typically not suitable for general purpose interpretation, i.e., interpretation of arbitrary machine languages. This is because micro operations are defined in terms of hardware structure and have heretofore been devoid of language structure constructs. Actually, the primary function of micro processors, interpretation of machine language instructions, is being done indirectly, that is to say with more attention being paid to hardware resources than the above mentioned language structure constructs (e.g. grammer). How this indirect processing affects interpretation may be better appreciated by an understanding of the programming languages sought to be interpreted.

As is well known by those skilled in the art, several levels of program languages exist. In general programming languagess may be put into one of three classes: high level language programs (HLLP), assembly level language programs (ALLP), and machine level language programs (MLLP). Interpretation by a micro processor typically takes place at the MLLP level since, as is well known in the art, a MLLP is hardware oriented, not programming oriented, and requires only a single level of translation (interpretation) prior to execution. This is to say that a MLLP is a "first order" language.

ALLP's are in some sense "second order" languages in that first a translation process, termed "assembling" the language, is usually performed in order to go from an ALLP to a MLLP prior to interpretation (execution). This translation prior to interpretation is occasioned by the fact that ALLP's are designed to be more programmer oriented than MLLP's, i.e., the language is a step closer to the normal language used by a programmer in his environment, for example, the English language, and a step further from a normal language used by the machine in its environment, namely a binary code.

Still further up the hierarchy of languages are HLLP's which are in some sense third order languages in that a translation process, typically more complex than the assembly process referred to above and commonly referred to as the process of compiling, must be performed to linearize the HLLP, that is to translate it into a MLLP. HLLP's are typically the most programmer oriented and the least hardware oriented type of programming language.

Since HLLP's are obviously most suited to programmer (human) versus machine needs, high level language programming is becoming an increasingly popular vehicle for programming in general. In addition it should be noted that memory requirements for storing a representation of a HLLP is generally as little as one tenth the memory for storing the same program in MLLP form.

As a result of the indirect process of interpretation, referred to above, which pervades the prior art, it is very difficult, if not impossible in some cases, to realize an economically feasible and inherently programmable micro processor for interpreting programs which are not as "linear" as a MLLP. This is because no interpretation oriented language exists to allow the micro programmer to program in terms of constructs related to the process of interpretation. Instead, the micro programmer must program in terms of the hardware oriented micro steps referred to hereinbefore. Many hardware oriented micro steps, arranged in physically and conceptually complex sequences, would be required to directly interpret even the simplest interpretable HLLP. It should be noted that an interpretable HLLP is defined to be the equivalent HLLP with symbolic names replaced by direct access information (direct addresses). The physical process of replacing symbolic names with direct access information constitutes no part of the instant invention and is believed to be obvious to those skilled in the art. Hereinafter any reference made to interpreting a high level language program refers to the interpretation of an interpretable high level language program. It should be further noted that an interpretable HLLP is stored as a string of 1's and 0's prior to interpretation. The string to be processed is hereinafter referred to as an interpretable language string (ILS).

Clearly, it would be desirable to be able to interpret HLLP's in a direct and inherently micro programmable manner as opposed to the indirect manner discussed hereinbefore. Even more desirable would be a general purpose machine organized for interpretation, that is a machine capable of interpreting arbitrary machine languages, (defined to include interpretable HLLP's as well as MLLP's) in a direct and inherently micro programmable manner.

Thus, it is an object of this invention to set out a general purpose computer organization suitable for supporting the process of interpretation in an optimal manner.

It is a further object of this invention to establish the essential set of elementary operations (i.e., the instruction set for the aforementioned general purpose computer organization) which is capable of supporting the process of interpretation in general and which allows for easily programmed high level language processors.

It is still a further object of this invention to provide methods of interpreting and executing arbitrary machine languages in an optimal manner.

SUMMARY OF THE INVENTION

The invention comprises an inherently micro programmable general purpose high level language processor. The processor design is a function of the hardware requirements necessary to give effect to (execute) a set of instructions hereinafter referred to as elementary operations. The set of elementary operations comprises an interpretation oriented language which permits the micro programmer to program in terms of constructs related to the process of interpretation. It is important to note that, according to the invention, hardware comprising the high level language processor is built to support interpretation. In the prior art, the instructions available to perform interpretation (micro instructions) were dependent on hardware design. Thus the relationship between elementary operations and the high level language processor hardware is a significant departure from the relationship between micro operations and micro programmed hardware of the prior art in that, according to the invention, no indirect interpretation in terms of hardware imposed requirements needs to be performed by the micro programmer.

It is important to note that the high level language processor which is the subject of this invention allows for direct processing of the interpretable version of a high level language, referred to hereinbefore as an interpretable language string (ILS). Contemporary machine languages are examples of ILS's. Without limiting the invention and for the purposes of illustration only, contemporary machine languages are utilized herein as the vehicle for explaining interpretation performed according to the invention. Hence, references hereinafter to operation codes and parameters of an ILS refer to operation codes and parameters as they are traditionally thought of in the context of contemporary machine languages.

According to the invention, interpretation of these ILS's is performed by sequentially extracting operation codes and parameters from the string before the processing of the extracted items is performed. This method of sequential extraction as applied to an ILS will be hereinafter referred to as machine level sequential extraction (MLSE). MLSE implemented on the microprogramming level, just one of the facets of the instant invention, is conducive to the processing of ILS's. This is because MLSE provides efficient means of extracting program characters of arbitrary bit lengths, allows instructions to be placed in memory as a string irrespective of memory word boundaries, and provides a very efficient means for processing information stored in a compact fashion.

The processing of a machine level instruction begins with the extraction of the machine level operation code. The operation code is then isolated. Next, a sequence of Elementary Operations corresponding to the machine level operation code is invoked by a method such as associative or linear decoding applied on the microprogramming level. Each sequence of Elementary Operations which is invoked directs the machine through the steps required to physically execute the decoded instruction. This includes extraction, isolation and processing of parameters, if any, associated with the machine level operation code. Upon completion of executing a set of elementary operations associated with a given machine level operation code, MLSE would be again performed on the ILS string in order to decode the next machine level operation code. It should be noted that the sequences of elementary operations corresponding to a given operation code may be thought of as subroutines of a primary level routine wherein the primary level routine performs the method of MLSE on the OP codes and the linear decoding. These subroutines may be nested to any desired level in order to direct the machine through the required operation. Furthermore, while within an elementary language subroutine, the method of MLSE and decoding may be further invoked on program characters which when decoded will invoke still other elementary operation subroutines which are by nature either lower in level in the hierarchy of subroutines or are recursive in nature. In this manner elementary language programs may be organized into a structure corresponding to the grammatical structure of any high level language, thereby providing means to efficiently process interpretable language strings. A detailed explanation of the methods of MLSE and decoding on the microprogramming level, will be presented hereinafter in the detailed description.

In addition to MLSE, the method of elementary level sequential extraction (ELSE) is performed on elementary operations stored sequentially in memory. These stored elementary operations constitute the interpretation programs (referred to hereinbefore as subroutines). The method of ELSE is similar to MLSE, however, elementary operations are the instructions to be extracted, decoded, and executed by the hardware.

Thus, the hardware to support the methods of MLSE, ELSE, together with the rest of the hardware to support the other elementary operations, (other since extraction itself is an elementary operation), comprise the apparatus of this invention.

The end result is an inherently microprogrammable high level language processor with the elementary operations serving as the interpretation oriented tools for the microprogrammer.

It should be noted that it is the method of ELSE which permits (1) arbitrary format of elementary operations, (2) extendability of elementary operations, (3) independence of memory word boundaries on the microprogramming level and (4) independence of micro memory cycle and main memory cycle.

An example of a direct advantage of the invention would be its use in the telephone field. Currently telephony applications require significant amounts of core memory to store programs which are used to control a telephone office. Core storage requirements could possibly be reduced by as much as an order of magnitude if programming for control could be performed on a high level language basis and stored in ILS fashion. The ILS representation of a HLLP could be easily processed by the new HLL processor under the microprogrammers control since the microprogrammer would now have available the tools with which to interpret HLLPs in an appropriate manner, namely by constructing elementary operation interpretation programs from the elementary operation set.

In summary, the combination of a HLL processor designed to support a set of elementary operations which provide for inherent microprogrammability of the processor, and the methods of MLSE, ELSE, and decoding of the program characters, applied on a microprogramming level to perform direct interpretation of an ILS, is the nub of the invention.

The key feature of the invention is the inherent microprogrammability of the high level language processor, i.e., the ease with which it may be programmed.

A further feature of the invention is a set of elementary operations which are versatile enough to be used efficiently in interpreting HLLP's in general. The general purpose nature of the high level language processor makes it desirable since a variety of high level languages may be employed at the option of the user to solve a given problem without fearing interpretation difficulties. This is because the elementary operations taught herein are capable of processing any ILS in a universally optimal manner.

A still further feature of the invention is a high level language processor structure capable of supporting the process of interpretation in general.

BRIEF DESCRIPTION OF THE DRAWINGS

These and other features of the present invention will be more readily apparent from the following detailed description taken in conjunction with the accompanying drawing.

DETAILED DESCRIPTION

What follows is a description of a high level language processor designed to support the process of interpretation.

To begin with, the operation of the processor may be visualized on two levels. First, the execution (interpretation) of interpretable language strings, and second the execution of micro routines comprised of the elementary operations referred to hereinbefore and to be described in detail below. These micro routines (actually elementary language interpretation programs) are directly executed by the processor.

Figure 1:
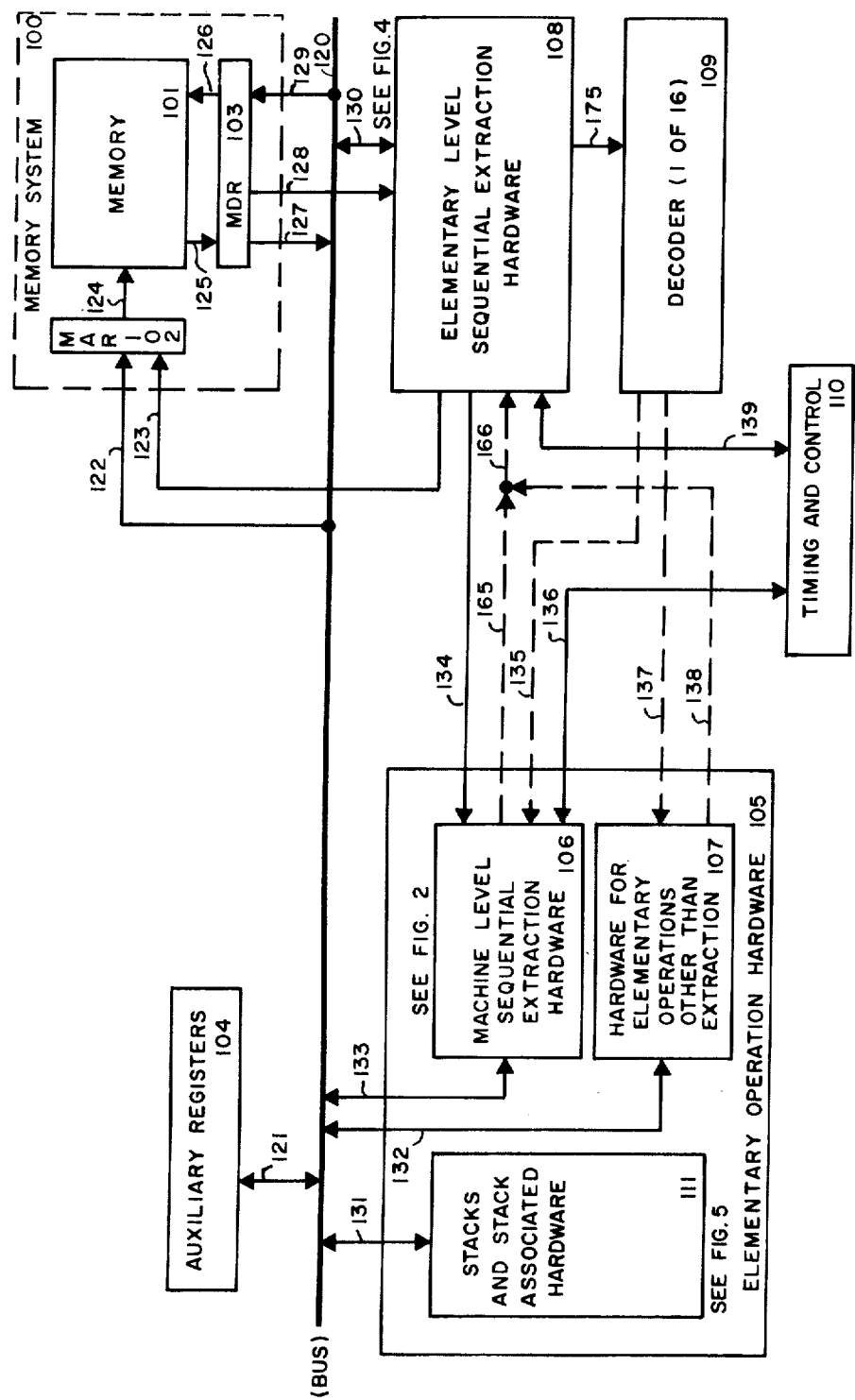
FIG. 1 displays a high level language processor built in accordance with the present invention.

FIG. 1 displays a high level language processor built in accordance with the principles of the present invention. In particular a machine organization is displayed which is capable of supporting the two levels of operation referred to above.

For the sake of illustration the following assumptions will be made. First, the memory 101 of the machine 1 depicted in FIG. 1 is assumed to be comprised of a set of 16 bit words. Secondly, without limiting the choice of format, it is assumed that each of the elementary operations to be described herein may be initiated by a 4 bit elementary operation code. Thus, according to the illustrative embodiment to be set out herein, 16 elementary operations may be supported without resorting to the extended operation code feature referred to hereinbefore and to be described in detail below.

Examining FIG. 1 in greater detail, one will observe that the high level language processor is comprised of the following elements. The first element is memory subsystem 100. Memory subsystem 100, shown enclosed in a dashed line rectangle, is actually not a physical part of the high level language processor itself (although part of it may be a physical part of the high level language processor in an alternate embodiment) but must be frequently accessed by the processor. Memory 100 further comprises a memory access register MAR, 102, memory data register, MDR, 103, and the memory itself, memory 101. As indicated above, memory 101 comprises 16 bits per word. Memory subsystem 100 is shown interconnected with bus 120, which is the main (but slow) access route to the other functional blocks of the processor depicted in FIG. 1. Link 122 is the means by which the addressing signals on bus 120, which correspond to addresses to be accessed in 101, may be input to MAR 102. These signals would first be input into MAR 102 and at the appropriate cycle time (read or write cycle) signals will be transferred either from or to the address specified to and from MDR 103. Information from memory 101 is output via link 125 to MDR 103. Access to bus 120 may be had from MDR 103 via link 127. Link 129 serves as an interface between bus 120 and MDR 103 so that data may be transferred from bus 120 to MDR 103 to be stored during the upcoming write cycle. Link 126 is shown as interconnecting MDR 103 and memory 101.

The second major element depicted in FIG. 1 is elementary operation hardware 105 which supports the first level of operation referred to above, namely the execution (interpretation) of ILS's. Unit 105 also comprises the logic and hardware to support the overall set of defined elementary operations. In particular, FIG. 1 depicts elementary operation hardware 105 as being further comprised of stacks and stack associated hardware (unit 111); machine level sequential extraction hardware (unit 106), which directly allows the machine to operate on the first level referred to hereinbefore; and hardware for elementary operations other than extraction (unit 107), which comprises the logic for performing all of the elementary operations other than extraction. Each operation, including extraction, will be explained in detail below. Unit 107 further comprises an arithmetic unit for performing basic arithmetic operations, such as addition and subtraction, as may be required to execute a given elementary operation. The function of the arithmetic unit in the context of unit 107 will be apparent when the detailed explanation of each elementary operation is set out.

Also depicted in FIG. 1 is elementary level sequential extraction hardware (unit 108) which supports the second level of operation referred to above.

Other units displayed in FIG. 1 include decoder 109 which, according to the preferred embodiment of the invention, is a 1 of 16 decoder. Decoder 109 identifies the elementary operation to be performed and initiates the logic in unit 105 corresponding to the decoded elementary OP code. Also shown in FIG. 1 are timing and control unit 110 and auxiliary registers 104. Unit 110 performs the general function of system synchronization and is the mechanism by which, for example, gates are energized so that data may be transferred from one register to another. Inputs from unit 110 to blocks 106 and 108 are shown directly via links 136 and 139 since the timing and control inputs are explicitly utilized by these blocks on a register level to perform the overall function of blocks 106 and 108. It should be obvious that although all of the links from timing and control 110 to the other functional blocks (like memory) are not shown explicitly, timing and control 110 in effect interfaces with every unit in the system to maintain overall system synchronization and gate level control.

The remaining discussion of FIG. 1 indicates the purpose of the various links not previously discussed. Links 123 and 128, interconnected between memory subsystem 100 and unit 108, provide fast access routes for signals from and to unit 108. Unit 108 may of course access memory subsystem 100 via bus 120; however, due to the frequent accesses and quick response demanded by unit 108, the fast access routes are desirable in the preferred embodiment. The link between unit 108 and bus 120 is shown in FIG. 1 as link 130. Unit 108 is also shown connected to decoder 109 and unit 106. Decoder 109 is accessed via link 175 while unit 106 may be accessed via link 134.

Also shown input to unit 108 in FIG. 1, in dashed line form, is link 166. Link 166 results from the juncture of dashed line links 165 and 138. The dashed line links indicate an interface on the logic level of at least one of the interconnected units. Since the logic level description of the processor in its totality would be quite cumbersome, a register level description was chosen for illustrative purposes herein. However, in cases where it is essential to show the connection with one block on a register level, originating or terminating at the logic level in another block, the dashed link links are utilized. In particular, with respect to links 138, 165, and 166, the execution of a given elementary operation on the logic level in units 106 and 107 causes a number to be inserted into a counter located within unit 108 (unit 108 to be described in detail hereinafter). Such number corresponds to the predefined number of parameters typically associated with the given elementary operation. The dashed link links indicate that as part of the logic for execution of a particular elementary operation, the number of parameters to be processed is gated to the aforementioned counter within unit 108. Thus, the dashed lines indicate an interface between the logic level implementation of blocks 106 and 107 and the register level implementation of unit 108.

Similarly, dashed lines links 135 and 137, shown emanating from decoder 109 and going to units 106 and 107, indicate a register level/logic level interface. Logic within units 106 and 107, corresponding to the particular elementary operation that was decoded by decoder 109, has to be initiated following identification of the operation to be performed. Dashed line links 135 and 137 indicate the appropriate logic to execute a decoded operation invoked following the decoding process. It should be noted that although logic for implementing each elementary operation is not explicitly depicted herein, a detailed description of each elementary operation is presented. The choice of the logic to implement a described elementary operation is optional and those skilled in the art may implement a given elementary operation in what is believed to be an obvious manner once the description of each operation is set forth.

Finally, units 106, 107, and 111 of unit 105 are shown interconnected to bus 120 via links 131, 133, and 132 respectively. A direct link from auxiliary registers 104 to bus 120 is shown in FIG. 1 as link 121.

The combination of the above functional blocks in the structure depicted in FIG. 1 and as described above constitutes a general high level language processor capable of supporting the process of interpretation. A detailed description of the function and structure of the main blocks depicted in FIG. 1 follows.

The machine level sequential extraction hardware depicted in FIG. 1 as unit 106, within unit 105, presents a convenient place to begin the rigorous detailed description of the invention since, it is within unit 106 that hardware exists to support the first level of operation (machine level sequential extraction) referred to above.

Figure 2:
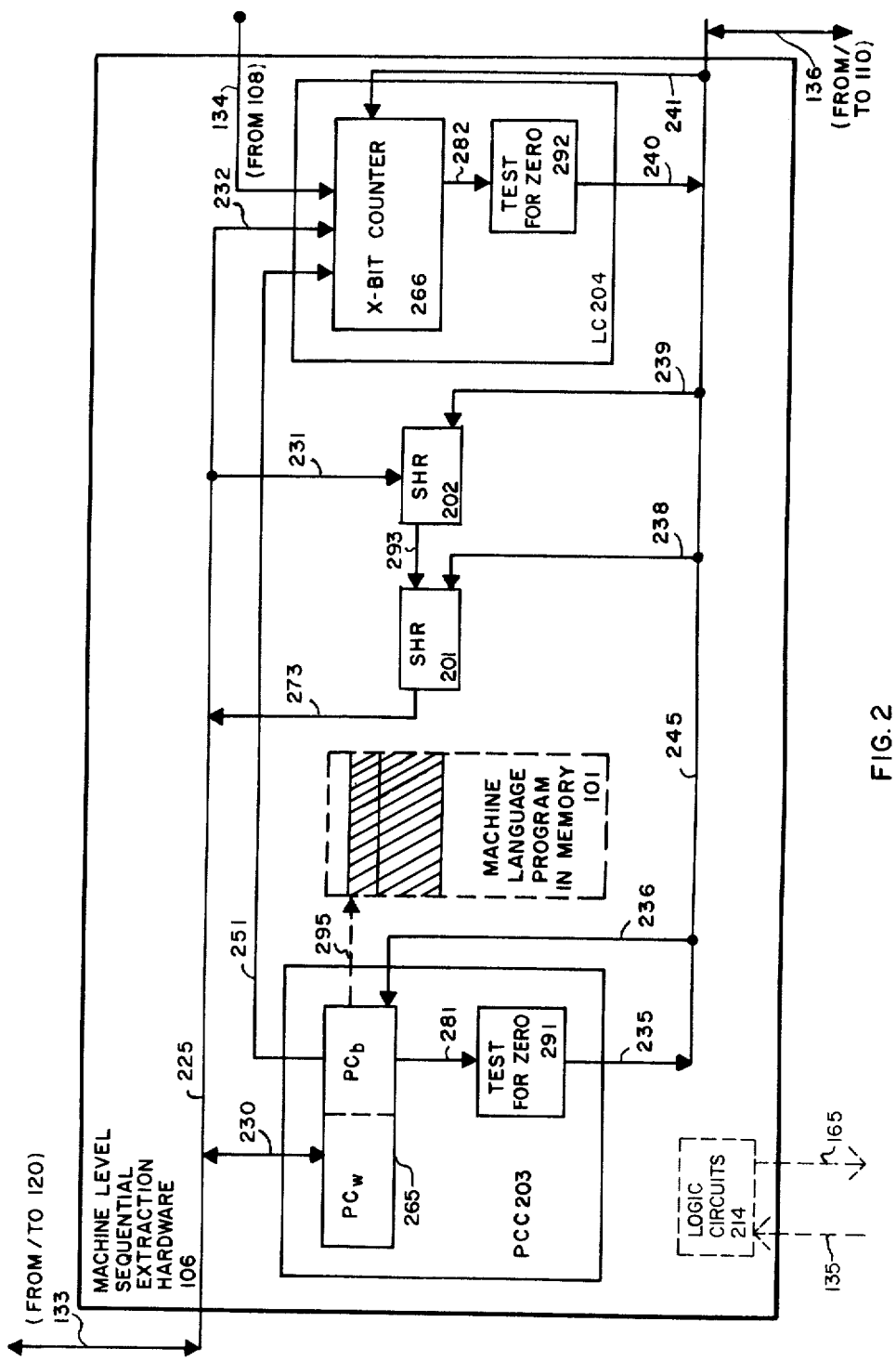
FIG. 2 displays the machine level sequential extraction hardware portion of FIG. 1 in greater detail.

FIG. 2 shows the details of machine level sequential extraction hardware 106. Consistent with FIG. 1, link 133 is shown as the communication link between unit 106 and bus 120 and link 136 is shown as the communication link between timing and control unit 110 and unit 106. In particular, FIG. 2 shows unit 106 as being comprised of program character counter (PCC) 203, shift registers 201 and 202, and local counter (LC) 204. PCC 203 is depicted as being comprised of register 265 interconnected via link 281 with test for zero logic 291. Register 265 is an up counter and is depicted in two portions; a word portion, $PC_W$, and bit portion, $PC_B$, respectively. The word portion of register 265 must be capable of pointing to any word in memory 101. Thus, in a machine with, for example, 4096 memory words, the $PC_W$ portion of register 265 would be 12 bits long. The $PC_B$ portion of register 265 must be capable of pointing to any bit in the machine word pointed to by the $PC_W$ portion of register 265. Thus, the $PC_B$ portion of register 265 would be 4 bits long, according to the illustrative example being set out herein, since the machine words of memory 101 are assumed to be 16 bits in length.

Still referring to FIG. 2, LC 204 is depicted as being comprised of register 266, interconnected via link 282 with test for zero logic 292. Register 266 is an $x$ bit down counter where $2^x$ is the maximum number of bits that may be extracted via a single extraction operation. According to the preferred embodiment of the invention $x$ is upperbounded to the extent that $2^x$ bits does not exceed the bit length of the memory word.

Shift registers 201 and 202 must each be capable of holding one memory words worth of data. Thus, according to the preferred embodiment of the invention, registers 201 and 202 are each 16 bits long.

The following discussion of FIG. 2 indicates the purpose of the various links not previously discussed in detail. Register 265 is shown interconnected with bus 120 via bus interface link 133 and via links 225 and 230. The bit portion of register 265, $PC_B$, is shown interconnected to test for zero logic 291 via link 281. Whenever the bits comprising $PC_B$ are all zero, test for zero logic 291 causes a signal to be output on link 235 which will then find its way to timing and control unit 110, for reasons to be described hereinafter, via links 245 and 136. Link 245 is the main communication link between timing and control 110 and the individual units displayed within unit 106. In particular, links 236, 238, 239 and 241 are utilized to convey signals from timing and control unit 110 to units 203, 201, 202, and 204 respectively. Link 245 carries information from units 203 and 204 towards unit 110 via links 235 and 240 respectively. Signals from bus 120, finding their way to link 225 via link 133, may be input to any of units 203, 202, or 204 via links 230, 231 and 232 respectively. Information going toward bus 130 from units 203 and 201 may be output via links 230 and 273 respectively. FIG. 2 also displays link 134 as inputting data from unit 108 to register 266 within local counter 204. The nature and function of this input will be explained hereinafter in the section on elementary language sequential extraction.

The remaining links in FIG. 2 which have not been described above are links 282, 293, 295 and 251. Link 282 interconnects counter 266 with test for zero logic 292 within LC 204. Whenever the $x$ bits of counter 266 are all zero, test for zero logic 292 is to send a signal toward unit 110 indicating the zero condition in the counter. The reason for this signalling will be made clear in the detailed description of LC 204 to be presented hereinafter. Link 293 is used to interconnect shift register 202 and shift register 201. Left shifts only are performed from shift register 202 into shift register 201 via link 293. Link 295 is shown in dashed form pointing into the portion of memory 101 containing the machine language program being interpreted. The dashed line indicates that the contents of counter 265 point to the word and bit within memory 101 where sequential extraction of the machine language program is to commence. Link 251 allows $x$ bit counter 266 in LC 204 to be set to the value of the $PC_B$ portion of register 265 upon signal from unit 110. The purpose is for initialization, the details of which are presented later herein. FIG. 2 also depicts logic circuits 214 which are connected over paths 135 to the output of decoder 109 and over paths 165, 166 to a counter in unit 108 for the purpose of providing a binary number corresponding to the length of the parameter associated with the extraction instruction being decoded.

Prior to the detailed discussion of how the apparatus in FIG. 2 is utilized to perform machine level sequential extraction, an overview of machine level sequential extraction on a conceptual level will be presented.

Execution of programs may be assumed to be a sequential processing of so-called characters constituting that program. One of the most essential processes related to interpretation is the machine level sequential extraction as described immediately below. Machine level sequential extraction is a method of separating an $n$ bit string, constituting the program character to be processed next, from an interpretable language string. As indicated above, sequential extraction must also be performed on elementary language programs as well as machine language programs. Sequential extraction on the elementary language program level will be discussed in detail herein and constitutes the second level of processor operation referred to hereinbefore. The discussion of elementary language sequential extraction is deferred until after the discussion of the first level of processor operation; namely, machine language sequential extraction.

One can visualize a machine language program as a string of instructions. In turn, each instruction is made up of an operation code followed by 0, 1, or more parameters. Such a string was defined hereinbefore as an interpretable language string (ILS). The function of the machine is to execute the instructions in left to right sequence (except in the cases where an instruction is a branch). As indicated above, the program is assumed to reside in memory 101 and be pointed to by the contents of register 265. Before an instruction can be executed, the instruction, or its parts, has to be removed from memory and be made ready for processing. Since, in the prior art, the format of instructions was typically closely related to memory word boundaries, retrieval of an instruction from memory was virtually equivalent to reading a memory word. In the more general case presented here, the instructions, as well as the individual program characters, are independent of memory word boundaries.

According to the invention, the processing of an instruction involves the separating of the OP code from the ILS and decoding of the OP code. The definition of the instruction is implicit in its OP code. Only after the OP code is decoded does it become known what parameters follow the OP code in the ILS. The parameters, in the general case, have to be separated from the string individually and also be made ready for processing. This process of separation of a program character from the ILS and making it ready for processing constitutes what is defined herein as the method of extraction. Note that extraction has to be applied to all program characters constituting a program. Furthermore, the extraction has to be performed in the left to right sequence. This is why the desired extraction is referred to herein as "sequential" extraction.

The sequential extraction mechanism applied on the machine language level assumes that the program character to be extracted is, as indicated above, pointed to by register 265. The method of extraction itself, on a conceptual level, involves the following steps: (1), removing an n bit character from the interpretable language string; (2), right justifying the character so removed in a register; and (3), updating the value of register 265 so that it points to the next character in the interpretable language string.

Figure 3:
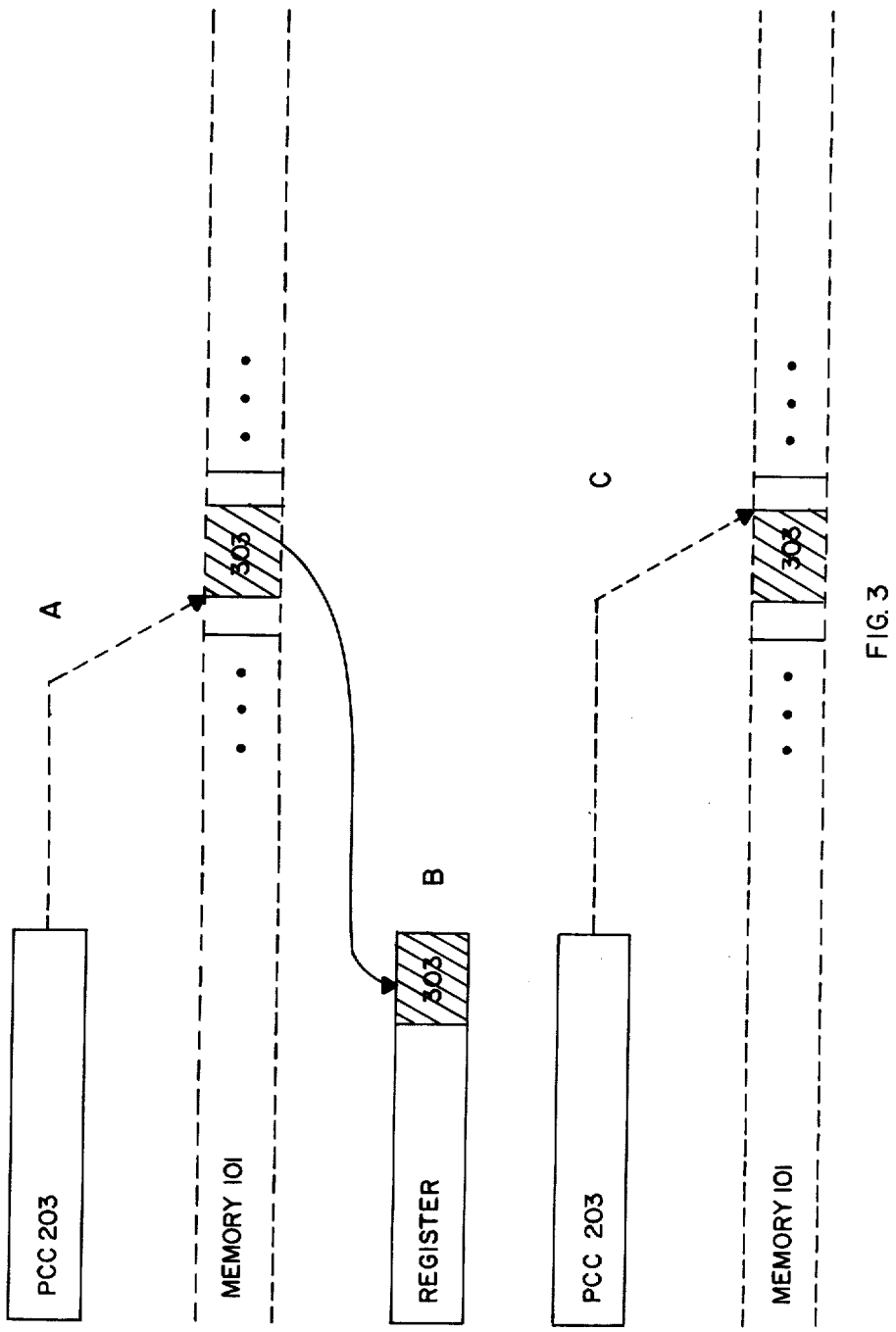
FIG. 3 displays the conceptual mechanics of sequential extraction.

Line A of FIG. 3 depicts a computer program, represented as a string of characters, located in memory 101. Note that at no point is it assumed that the program characters are situated in any fixed location with respect to memory word boundaries. Indeed, in a general case, a single program character can be located in the field adjacent to a word boundary, fully within a word or across a word boundary. Specifically, line A in FIG. 3 shows PCC 203 pointing to a program character in an unspecified location of memory 101, said character being labeled as program character 303. The $PC_W$ portion of register 265 within PCC 203 (see FIG. 2) would point to the word containing the character to be extracted while the $PC_B$ portion of register 265 would point to the very first bit to be extracted. Line B of FIG. 3 shows one of the physical results desired upon execution of the method of sequential extraction, namely that the data to be extracted from the ILS string is located right justified in some register. Finally, line C of FIG. 3 shows that PCC 203 is modified after extraction of character 303 to point to the program character following character 303 in the ILS.

It should be noted that the extracted program character, right justified in a register (or alternatively a memory location), may be utilized, according to the preferred embodiment of the invention, as an index into an address table to locate the address of the set of elementary operations in memory 101 which must be executed in order to execute the desired machine language instruction. This method of indexing is referred to herein as linear decoding. How the elementary language instructions are extracted from memory, decoded and executed, starts with the elementary language sequential extraction process to be described hereinafter.

Having completed the conceptual description of machine level sequential extraction, a detailed example of a hardware implementation of machine level sequential extraction with reference to FIG. 2 is presented. The example presented allows the characters to entirely transcend memory word boundaries.

To begin with, it is assumed that extraction of an $n$ bit program character is invoked by execution of one of the following operations, said operations constituting a part of the elementary operation set to be fully described herein. The operations are: ET $n$ (extract $n$ bits) and ETI (extract implicit). The operation ET $n$ assumes that the operand $n$ (number of bits to be extracted) is embedded in the instruction itself. The operation ETI assumes that the value $n$ is stored in a known register, (for example one of auxiliary registers 104), or in a known memory location (for example on top of a stack) implicitly referenced by operation ETI.

The detailed implementation of the preferred embodiment of the sequential extraction mechanism on the machine level is as follows.

For the sake of illustration suppose that an ET $n$ operation is to be executed. After extraction and decoding of this elementary operation by units 108 and 109, (units 108 and 109 to be described in detail hereinafter) the value $n$ would be placed in counter 266 via link 134. It should be noted at this point that if an ETI instruction were to be executed the only difference would be the source of the value to be placed in counter 266. With ET $n$, as indicated above, the value $n$ is embedded in the instruction itself and hence comes from unit 108 via link 134. In the case of ETI it is assumed that the value in question resides in a separate location in either a register or memory. Thus, to commence execution of ETI, the value must be moved from memory 101 into counter 266 via bus 120, links 133 and 232. After counter 266 is loaded, the execution of both ETI and ET $n$ is identical and completely supported by the hardware depicted in FIG. 2.

Referring again to FIG. 2, although the field to be extracted can begin anywhere in memory 101, it is assumed, for the sake of illustration only, that the field to be extracted is left justified in the memory word being pointed to by PCC 203. This memory word must first be read out of memory 101. This is accomplished by placing the address of the word to be fetched (recall the address is in PCC 203, register 265) into MAR 102. This is accomplished via links 230, 225, 133, bus 120 and link 122. During the next read cycle, the 16 bit word at the address pointed to by register 265 is transferred from memory 101 to shift register 202 via link 125, MDR 103, link 127, bus 120, link 133, link 225 and finally link 231. Next, register 201 is cleared and $n$ bits (if an $n$ bit character is to be extracted) are left shifted from register 202 into register 201 via link 293.

With each bit shifted from register 202 to register 201, counter 266 in LC 204 is decremented by 1. This way, counter 266 controls the operation of machine level sequential extraction by allowing the bits to be shifted from register 202 to 201 until the value of the counter is zero. Shifting ceases when test for zero logic 292 signals control 110 via links 240, 245 and 146 that the counter has run down.

As indicated hereinbefore PCC 203 is organized to interconnect register 265 and test for zero logic 291. Register 265 is an up counter. As explained above register 265 is assumed to contain the address of the field to be extracted. With each bit shifted from register 202 to register 201, the bit portion of register 265 is incremented by 1. Since the word and bit portions of register 265 are adjacent, the work portion of register 265 is automatically incremented by 1 whenever the bit portion of register 265 passes through all zeros. In the case that the bit portion of register 265 contains all zeros a work word has been crossed thereby necessitating the incrementation of the word portion of register 265 and the bringing of a new memory word into register 202 is commenced by control unit 110.

Continuing with the example of extraction of a field that was assumed to be left justified in the memory word, note that the bit portion of register 265 prior to the extraction is equal to zero since the field to be extracted is left justified in the memory word. With each shift of data from register 202 to 201, counter 265 counts up, so that after moving $n$ bits to register 201, register 265 contains the address of the first bit of the field that follows the field that has just been shifted out of register 202. Note that shifting from register 202 to register 201 separates the desired $n$ bit character. The character is now just justified in register 201 and it can immediately be used in further processing as a binary number (for example, an index as indicated above). For example, the index may be output via lines 273, 225, 133, bus 120 and link 121, to auxiliary register 104. The above method of separation and making the character ready for further processing constitutes the operation of extraction of program characters on the machine level.

After the character has been used (for instance transferred to another register where it may be used as an index) shift register 201 is then cleared and the next character sequentially in the ILS can be directly extracted through shifting. It should be noted that at this point there is no necessity for reading in a word from memory since a whole memory word was read into register 202 with a commencement of the extraction process and extraction may continue without a further reading into register 202 until all the bits of the $PC_B$ portion of PCC 203 are zero and a new word is required as explained above.

The following illustration will indicate how machine sequential extraction is performed when the character to be extracted is not just left justified and, when in fact the character to be extracted transcends a memory word boundary. Suppose that a memory word, $x$, contains characters A, B, and part of character C. C is assumed to "spill over" the right hand portion of the machine word into the next machine word. Suppose further that $x$ is loaded into register 202. An initial left shift of $n$ bits is sufficient to isolate the originally left justified character, A, in the manner described above. Without accessing memory again and upon clearing register 201 a left shift of the number of bits comprising character B may be performed to isolate character B in register 201. The extraction of character B would be initiated by loading counter 266 with the number of bits corresponding to character B and proceeding as in the above description of the extraction of the left justified character (note B is the left justified character in register 202 after character A is shifted out). Finally, when desiring to shift character C into register 201, noting that character C transcends a word boundary, the following would take place. The extraction through shifting begins as for field B; however at some point register 202 will become depleted. This situation can be detected by testing the $PC_B$ portion of register 265. At the time register 202 becomes depleted, register 265, as indicated above, makes a transition from pointing to the last bit of word $x$ ($PC_B$ all 1's) to the first bit of a new word ($PC_B$ all 0's) and $PC_W$ incremented by 1). As stated before, such a situation is detected by a test for zero logic 291 which will send a signal to timing and control unit 110 indicating that the cycle controlled by counter 204 is to be suspended and a new word is to be read out of memory 101. A new word is then transferred to register 202, the address of this new word being now located in register 265 in the $PC_W$ portion. After the new word has been placed in register 202, the count of counter 204 resumes and the operation of sequential extraction continues.

Suppose that machine level sequential extraction was to commence with character B located, according to the example above, $n$ bits into word $x$. Processing of a string beginning with character B could be performed in precisely the same manner as the strong beginning with a character left justified in register 202 prior to the commencement of the extraction process. The process of making the first character of an interpretable language string which is embedded in a machine word appear left justified in register 202 just prior to commencement of the extraction process is referred to hereinafter as initialization. The initialization process is as follows.

Note the $PC_W$ portion of register 265, for the example being recited herein, would contain the address $x$, and $PC_B$ portion of register 265 would contain the value $n$, i.e., the number of bits into word $x$ at which extraction is to commence when B is the first character of the interpretable language string. The initialization procedure begins by loading work $x$ into register 202. The $PC_B$ portion of register 265 is then loaded into register 266 of LC 204, via link 251. The counter causes (in conjunction with timing and control unit 110) a left shift of $n$ bits to take place from register 202 into 201. The result is character B left adjusted in register 202, ready for extraction in the manner described above. This initialization process may be utilized whenever the first character to be extracted is not left justified in the machine word as was initially assumed above.

What has been presented above is an example of an implementation of machine level sequential extraction. Other implementations may for instance include a register for buffering register 202 so that there is no need to wait for a word to be fetched from memory when register 202 is depleted. This anticipation is possible because of the sequentiality of operations. Further, there are solutions simulating the behavior of shift registers with combinatorial logic. According to such solutions shifting may be eliminated entirely. Other implementations of hardware to perform a machine level sequential extraction may be readily devised by those of ordinary skill in the art without departing from the scope and the spirit of the invention.

Figure 4:
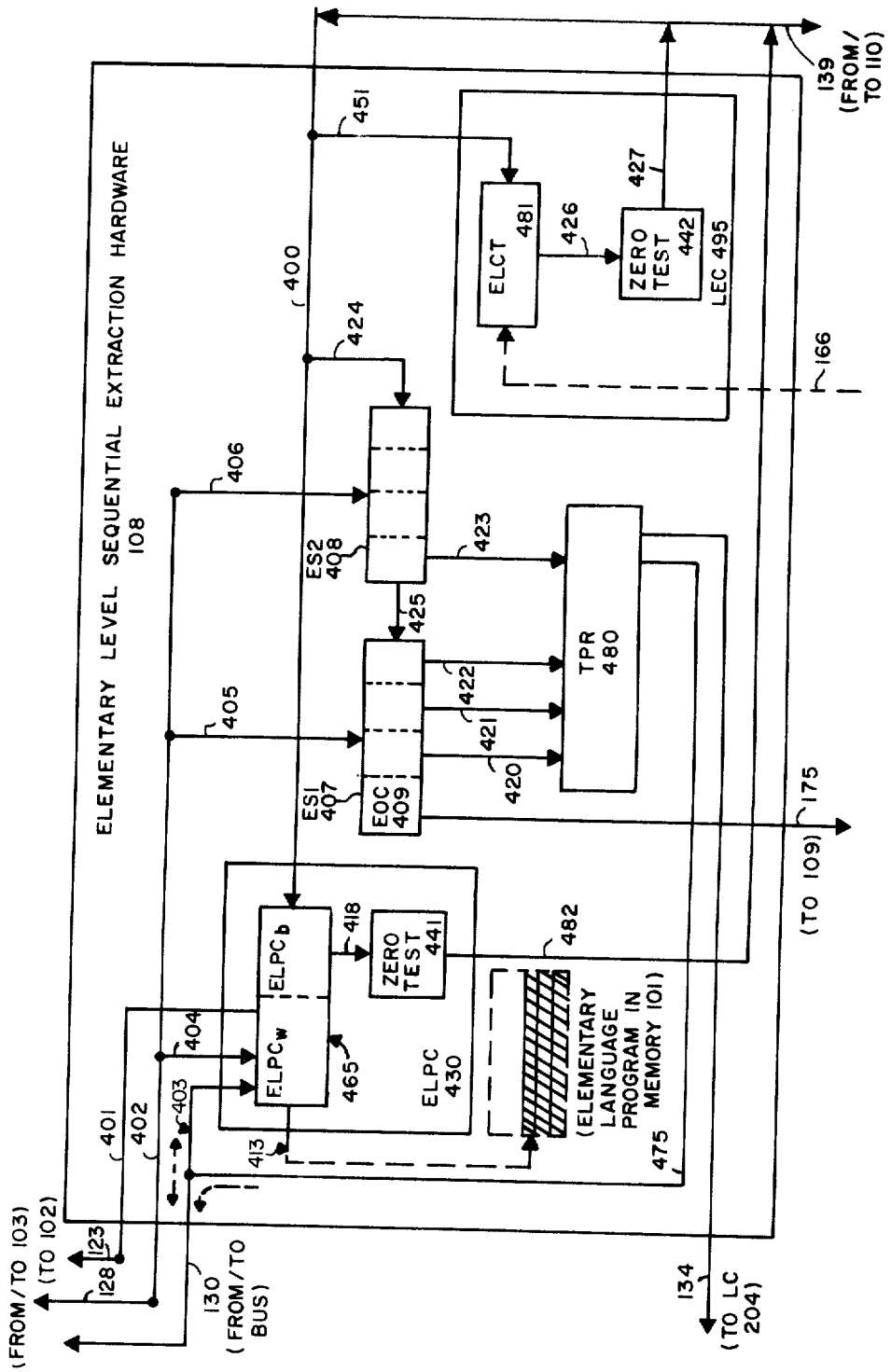
FIG. 4 displays the elementary sequential extraction hardware of FIG. 1 in greater detail.

Turning attention to the second level of processor operation, namely elementary language sequential extraction, reference is to be made to FIG. 4. FIG. 4 depicts the details of unit 108 of FIG. 1 and is the apparatus for supporting the method of elementary language sequential extraction, said method and apparatus to be described in detail below.

It may be seen from FIG. 4 that the apparatus for supporting elementary language sequential extraction comprises elementary program counter (ELPC) 430, two elementary shift registers (elementary shift register 1, ES1, shown as unit 407, and elementary shift register 2, ES2, shown in unit 408), a local elementary counter 495, and temporary parameter register (TPR) 480.

It should be noted that, consistent with FIG. 1, link 130 is shown as the communications link between bus 120 and unit 108; link 128 is shown as the fast access route between unit 108 and MDR 103; link 123 is shown as the fast access route between unit 108 and MAR 102; link 139 is the communications link between unit 108 and timing and control unit 110; link 134 is the communications link between unit 108 and LC 204 of unit 106; link 175 interconnects unit 108 with decoder 109 and finally, link 166 connects logic from units 106 and 107 with unit 108 (all of these links to and from unit 108 with other units of the high level language processor are described earlier with reference to FIG. 1).

ELPC 430 is depicted as being comprised of register 465 interconnected via link 481 with test for zero logic 441. Register 465 is an up counter and is depicted in two portions: a word portion, $ELPC_W$ and a bit portion, $ELPC_B$, respectively. If an elementary language program is allowed to be located any place in memory 101, the word portion of register 465 must be capable of pointing to any word in said memory. Thus, retaining the example of a machine with 4096 memory words, the $ELPC_W$ portion of register example, would be 12 bits long. The $ELPC_B$ portion of register 465 must be capable of pointing to the elementary operation program character to be extracted from the memory word pointed to by the $ELPC_W$ portion of register 465. For the sake of illustration it is assumed that all elementary program characters are multiples of 4 bits in length; thus, the $ELPC_B$ portion of register 465 must be 2 bits long. The invention is clearly not limited to a 4 bit elementary operation code and, for example 5 bits may be used to accommodate more than 16 operations or, alternatively, the extended OP code feature could be utilized to implement more than 16 operations with only 4 bits in a manner to be described later.

Referring again to FIG. 4, LEC 495 is depicted as being comprised of register 481, interconnected via link 426 with test for zero logic 442. Register 481 is a down counter and must be capable of holding a value corresponding to the maximum number of shifts that may be performed on 4 bit groups of data between ES1 407 and ES2 408. Shift registers 407 and 408 must each be capable of holding one memory words worth of data, i.e., 4, 4 bit elementary characters. Thus, according to the preferred embodiment of the invention, registers 407 and 408 are each 16 bits long. Finally, temporary parameter register 480 must be capable of maintaining, right justified, any 4 bit parameter associated with an elementary operation.

The following discussion of FIG. 4 indicates the purpose of the various links not previously discussed in detail. Register 465 is shown interconnected with links 123, 128, and 130 via links 401, a combination of links 402 and 404, and link 403 respectively. Link 128 is shown interconnected with unit 407 via links 402 and 405. Link 128 is also shown connected to unit 408 via links 402 and 406. Inputs from timing and control unit 110 via link 139 may be input to register 465 via link 400, ELCT 481 via link 451, and into unit 408 via links 400 and 424. Information flowing to timing and control from ELPC 430 is communicated via links 482 and 139. Information flowing from LEC 495 to timing and control unit 110 is communicated via links 427 and 139. Links 420, 421, 422, and 423 are shown as paths from units 407 and 408 to TPR 480 over which a parameter of up to 16 bits in length may be moved from the right most 12 bits of unit 407 and the left most 4 bits of unit 408. As indicated above, an extracted parameter (if any) is to be right justified in TPR 480 for use in accordance with the description of elementary language execution to be set out hereinafter. Link 425 is shown as interconnecting unit 408 and 407 and is the path over which left shifting between the two registers occurs (if from register 408 into register 407). Link 475 is shown as a means for connecting TPR 480 with bus 120 via link 130. Finally dashed link 413 indicated that register 465 points at a word in memory 101 and a field within said word, said field corresponding to the elementary language program character to be extracted, decoded, and executed.

What follows is a detailed description of the method of elementary language sequential extraction itself as supported by the apparatus of FIG. 4. Recall that it was assumed for the illustrative example that elementary operations have 4 bit OP codes. Assume further that the length of all information (parameter) fields is a multiple of 4 bits. The most general alternative of 1 bit resolution has not been chosen in the example because of its lower overall efficiency. However, the method described below can be applied to the 1 bit resolution case without any changes in concept.

Assume still further that a string of elementary operations resides in memory 101 in much the same manner that an interpretable language string resided in memory 101 when machine level sequential extraction was being discussed. At some point during the execution of the current operation the logic for the OP code causes ELPC 430 to point to the next operation. This is equivalent to placing the new operand left justified in ES1 407 and to placing the OP code for the new operation in EOC 409. Finally, the last step of the currently executing operation is to pass control to the decoding mechanism unit 109 of FIG. 1. The decoding mechanism accesses the new OP code from EOC 409, via link 175, and passes control to the hardware related to the new operation code. The exception to the described procedure constitutes the branch operations. In the case of branch operations the contents of ELPC 430 is replaced by an entirely new value, usually being transferred from some register of the machine, resulting in the ELPC pointing to an operation not in sequence. The last step of branch operation is also to pass control to the decode mechanism.

An example of extracting and decoding an elementary operation will serve to illustrate how the apparatus of FIG. 4 works. A presentation of the method of initializing the elementary language sequential extraction process will be presented shortly. One should not that according to the preferred embodiment of the invention the actual value (address) in ELPC 430 is one word beyond the OP code being examined (in EOC 409) at a given point in time. This is because of the initialization of register ES1 407 and ES2 408, to be described below, which requires that two words be transferred from memory prior to the commencement of the extraction process. However, in order to avoid confusion, further reference to the contents of ELPC 430 will be as if the address in ELPC 430 points at the OP code currently being processed, i.e., ELPC 430 is assumed to contain the address corresponding to the OP code in EOC 409. However at this point it assumed that the contents of ELPC 430 points to the program character which is now held in the left most 4 bits of ES1 407. The OP code, after initialization, is to be left justified in the left most 4 bits of register 407. EOC 409 is the name given to the left most 4 bit group of ES1 407. The parameters, if any, of an operation are located to the right of the OP code, each parameter being a multiple of 4 bits. Upon completion of execution of this (or any) operation, the following operation should be moved into such position in ES1 407 so that the new OP code will be held in EOC 409. This can be done in the following way. The operation currently executing knows its own length. To move the following operation into its place, the current operation places the number equivalent to its length or i.e., equal to the number of 4 bit groups comprising its length, into the ELCT 481 register. Thereafter, the shifting mechanism will be triggered since the value in ELCT 481 is non-zero.

A number of shifts is performed and this number is equal to the number stored initially in the ELCT 481. Each time a left shift of ES1 407 and ES2 408 is performed, ELCT 481 is decremented by 1. The shifting is completed when the value in ELCT 481 reaches 0. This condition is detected by test for zero logic 442 which signals timing and control unit 110 via links 427 and 139 that shifting is to cease. The result of the shifting is that a new elementary OP code appears in the left most section 409 of register ES1 407 and by doing so it makes it ready for processing. It is to be noted that each time the data is shifted left through ES2 408 and ES1 407, the counter ELCT 481 is decremented by 1, as mentioned above, while the counter ELPC 430 (actually register 465) is incremented by 1.

The sequence of shifting is interrupted whenever the register ES2 408 becomes depleted of program data. This condition is detected by testing the $ELPC_H$ portion of register 465 for zero. A new data word is then brought from memory, the address of the data word being obtained from $ELPC_{W}$ portion of register 265. After the word has been placed into register 408, counting is resumed until such time as the value in ELCT 481 becomes zero.

It should be noted the shifting operation is self-contained and makes the processing on the micro level independent of the position of the program characters with respect to memory word boundaries.

Above it was mentioned that shift registers ES1 407 and ES2 408 have to be initialized. Initialization means that if the elementary language program is to start to execute at some field of a word other than the left most 4 bit field, the registers ES1 407 and ES2 408 must be preloaded with the data from the memory in such a way that the program string starting the field to be processed is left justified in ES1 407 and is continuous through ES1 407 and ES2 408 in the way described in the explanation of initialization which follows.

Recall from the discussion of FIG. 2 that the result of machine level sequential extraction was an index (being number) right justified in a register (e.g., register 201). Recall further that line decoding utilizing said index may be performed to provide the address of the set of elementary operations (on elementary language program) in memory 101, corresponding to a decoded machine level OP code.

It is assumed that the address at which the elementary language program is to begin to execute has been loaded into ELPC 430 (actually register 465). This may be done in any one of a number of ways including via bus 120 after the linear decoding process is performed. The initialization process begins with register ES1 407 being loaded with the memory word whose address is in the word portion, $ELPC_W$, of register 465. After ES1 407 is loaded as above, the $ELPC_W$ portion of register 465 is incremented by 1. Next, register ES2 408 is loaded with the memory word pointed to by the incremented address in $ELPC_W$ portion of register 465. The address in register 465 may, in general, point to the middle of a memory word. This condition is indicated by the fact that the contents of the bit portion of register 465, $ELPC_B$, is transferred to counter ELCT 481. The non-zero value in ELCT 481 causes the data in ES1 407 and ES2 408 to be left shifted by a number of 4 bit groups equivalent to the value in ELCT 481. As indicated above left shifting may be controlled via ELCT 481. At the end of the shifting, the contents of $ELPC_W$ is the address of the next data word to be fetched from memory while the data in the register ES1 407 and ES2 408 is initialized in such a way that the program data that starts at the field to be processed is left justified in register ES1 407. Now execution may begin.

Just prior to execution of an elementary operation, its operation code is, as indicated above, in the left most portion of ES1 407 designated hereinbefore as EOC 409, while the parameters of the operation, if any, follow the OP code. The OP code has been placed in the left most position of ES1 407 during the initialization or by the action of the elementary operation prior to the operation of the current one. At the completion of its execution, the previous operation has triggered the decoding mechanism which acts on the data in EOC 409 (this as we mentioned above constitutes the OP code of the elementary operation to be decoded and executed). According to the example being set out herein, i.e., 4 bit OP codes, the OP code is decoded into one of 16 combinations. (A possible implementation of decoding requires sixteen 4-input-gates each wired for one of the OP codes). As shown in FIG. 4 link 475 connects the EOC 409 portion of register ES1 407 with decoder 109.

Referring back to FIG. 1 it may be seen that decoder 109 sends a signal to initiate a logic chain in one of units 106 or 107, said logic being designed to support the execution of the decoded operation. The execution of each elementary operation corresponds to executing the specially designed logic path. As indicated above, parameters for a particular elementary operation which reside in ES1 407 and ES2 408 may be called upon for processing and/or moved to TPR 480 via links 420 through 423 in such a manner as to have the desired parameter right justified in TPR 480 for processing. As an example, suppose that the operation ET $n$, described above, is to be executed. The operation code ET would be located in the EOC 409 portion of register ES1 407. The parameter $n$ would be located in the 4 bits immediately to the right of the EOC 409 portion of register 407. It should be noted that parameters in general, and parameter $n$ in particular, may occupy more than 4 bits. However, for the sake of illustration, parameter $n$ is upperbounded by the value 16, the maximum bit length of a machine word. Upon decoding of the EOC 409 portion of register 407 by decoder 109, it would be determined that the left most 4 bits in register ES1 407 correspond to the ET operation and, referring to FIG. 1, decoder 109 would signal machine level sequential extraction hardware 106, via link 135, that the apparatus in FIG. 2 is to be activated. Note that the parameter $n$ would go to TPR 480 via link 420 and would be right justified in TPR 480. It is from TPR 480 that the count ($n$) would be supplied to LC 204 in FIG. 2 via link 134. Thus, the apparatus of FIG. 4 may support the extraction and decoding of elementary operations.

Before going into a detailed description of each elementary operation in a set of elementary operations which are believed to be sufficient for supporting the process of interpretation, a description of the stacks and associated stack hardware, unit 111 of FIG. 1, will be presented.

The architecture of the high level language processor can be based on any number of known principles. For example, it can be a general purpose register machine. A preferred organization is based on the concept of having an execution stack. Nearly all of the operations to be described use the stack. The stack is a storage device for holding a set of data items. These items are stacked one on top of the other. An item can be removed from the top of the stack. A new item can be added to the top of the stack by being placed on the top of items already in the stack. In the present organization of the machine, the stack is implemented in memory 101.

Figure 5:
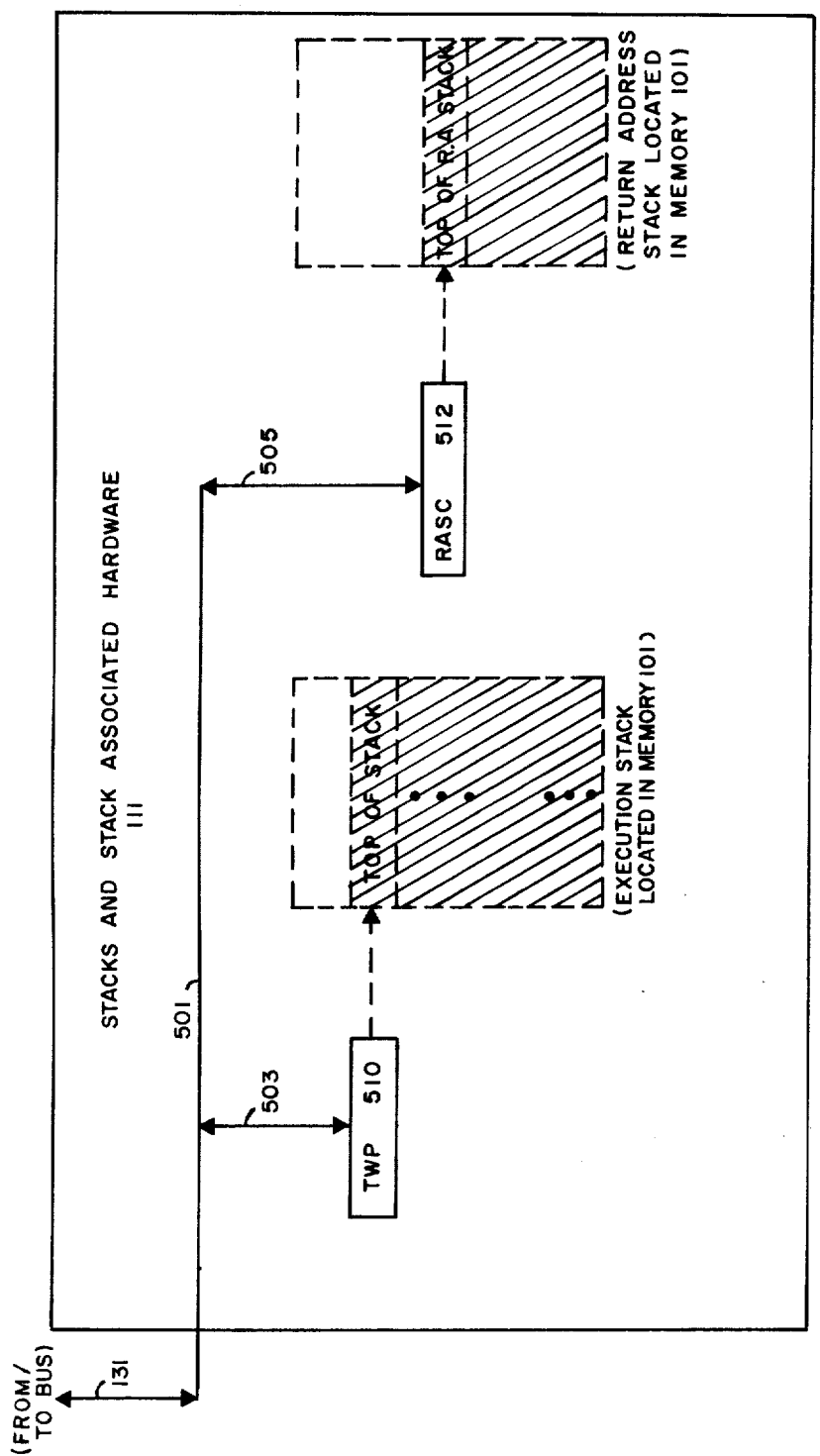
FIG. 5 displays the stacks and stack associated hardware of FIG. 1 in greater detail.

FIG. 5 shows the details of the stacks and stack associated hardware depicted in FIG. 1 as unit 111. Consistent with FIG. 1, link 131 is shown as the communications link between unit 111 and bus 120. Link 501 of unit 111 carries information to and from bus 120 to and from each of units 510 (via link 503) and 512 (via link 505). Unit 510 is designated in FIG. 5 as TWP which stands for Top Work Pointer register. The TWP register points to the top of the stack in memory 101. RASC 512 is the return address stack pointer and points to a second stack in memory 101 set up to maintain return addresses for subroutine nesting exclusively.

The address of the data item currently on the top of the stack is held in TWP 510. This register is organized as an up/down counter. By sending a control signal, TWP 510 may be incremented or decremented by one unit. When an item is placed in the stack, TWP 510 is incremented by one, and the incremented value in TWP 510 is used as the memory address, that is, the address at which the new item is to be placed. On the other hand, when an item is to be removed from the stack, the value in TWP 510 is used as an address, and after its use the TWP 510 is decremented by one. RASC 512 operates in an identical manner to TWP 510. The only function of registers 510 and 512 is to "push" items onto and "pop" items off of the portions of memory 101 reserved for use as the execution and return address stack.

The following is a table of elementary operations which comprise the instructions for the high level language processor set out herein. This set of instructions is believed sufficient to support the process of interpretation.

| OPERATION NAME | OP CODE | NO. OF EXPLICIT PARAMETERS | NO. OF IMPLICIT PARAMETERS |
| --- | --- | --- | --- |
| Extract n bits | ET | 1 | 0 |
| Extract Implicit | ETI | 0 | 1 |
| Insert | INS | 0 | 2 |
| Branch, Machine Language Level | BML | 0 | 1 |
| Store Program Address | SPA | 0 | 1 |
| Deposit Number | DN | 1 | 0 |
| Access and Replace | AR | 0 | 1 |
| Store | SR | 0 | 2 |
| Branch | BR | 0 | 1 |
| Store the Elementary Program Counter | SEPC | 0 | 1 |
| Branch to Subroutine | BS | 0 | 1 |
| Return from Subroutine | RS | 0 | 1 |
| Load Stack | LS | 0 | 1 |
| Store Stack | SS | 0 | 2 |
| Copy Top Word Pointer | CT | 0 | 1 |
| Move from Top of the Stack | MT | 0 | 1 |
| Copy | CY | 0 | 1 |
| Add | ADD | 0 | 2 |
| Subtract | SU | 0 | 2 |
| Test | TT | 0 | 2 |
| Function | FN | 0 | n |
| Escape | ESC | 0 | 1 |

The elementary operation set listed above will be described in detail below; however, it should be understood that this is only one set of elementary operations which may be devised and used in combination with the machine architecture presented herein for supporting the process of interpretation. A description of each of the elementary operations listed above follows immediately below. Logic corresponding to each described operation may readily be assembled by one of ordinary skill in the art to support each operation. This logic resides in unit 107 in FIG. 1 except for logic corresponding to ET and ETI which are, as explained hereinbefore, supported by unit 106 of FIG. 1 (shown in detail on a register level in FIG. 2).

The Operation "Extract n bits" ('ETn')

The operation 'ET' has been already described in detail with reference to FIG. 2, unit 106.

The Operation Extract Implicit (ETI)

ETI is executed in the same manner as ET except the number of bits to be extracted, as explained hereinbefore, is assumed to be located on top of the execution stack or in one of the auxiliary registers.

The Operation Insert (INS)

The two implicit parameters of INS are assumed to be on the top of the execution stack. The first parameter is a number of bits, n, corresponding to the length of a data item to be inserted into the program string. The second parameter is the data to be inserted into the program string. The parameters are removed from the execution stack, and the n bit data item is inserted into the program string, starting at the bit pointed to by PCC 203. PCC 203 is then incremented by n bits.

The Operation Branch Machine Language Level (BML)

BML has one implicit parameter which is located as the top word of the execution stack. This parameter is assumed to be the branch address. This word is removed from the execution stack and placed in PCC 203. Initialization of registers SHR1 201, SHR2 202 follows.

The Operation Store Program Address (SPA)

The copy of the contents of PCC 203 is placed on the top of the execution stack.

The Operation Deposit Number (ND n)

The value n, the explicit parameter of the operation, follows the OP-code of the elementary operation. This parameter is placed on the top of the execution stack.

The Operation Access and Replace (AR)

The operation AR assumes that the top of the execution stack is an address (an implicit parameter). This item is removed from the execution stack, and used to address the memory. A word is read out of the memory address pointed to and is placed on the top of the execution stack.

The Operation Store (SR)

The operation SR has two implicit parameters which are the two top words of the execution stack. These words are occupied by the memory address where the information item is to be stored and by the item itself. Both items are removed from the execution stack, and the data item is stored in memory 101.

The Operation Branch (BR)

The top item in the stack (an implicit parameter) is assumed to be the branch address. This item is removed from the stack and placed in ELPC 430 (register 465). Initialization of ES1 407 and ES2 408 follows.

The Operation Store the Elementary Program Counter (SEPC)

A copy of the contents of ELPC 430 (register 465) is placed on the top of the execution stack.

The Operation Branch to a Subroutine (BS)

The operation assumes that the branch address (an implicit parameter) is on the top of the execution stack. In the first step the contents of ELPC 430 (register 465) is saved. It is placed on the top of the Return Address Stack. Next the branch address is removed from the top of the execution stack and placed in ELPC 430 (register 465). Initialization of the registers ES1 407 and ES2 408 follows.

The Operation Return from Subroutine (RS)

The operation removes an item (a return address) from the Return Address Stack and places the item in register 465 of ELPC 430. Initialization of registers ES1 407 and ES2 408 follows. The return address is considered to be an implicit parameter.

The Operation Load Stack (LS)

The operation load stack assumes that the top of the execution stack contains a number, $k$. This number (an implicit parameter) is removed from the stack. Next, the top of the execution stack is loaded with the contents of the execution stack location which is $k$ items distant from the bottom of the stack.

The Operation Store Stack (SS)

The operation SS assumes the two top items of the execution stack (2 implicit parameters) are the number $k$ (see the description of the operation Load Stack), and a data item. The operation removes these two items from the execution stack, and stores the data item in the location $k$ items distant from the bottom of the execution stack.

The Operation Copy Top Word Pointer (CT)

The operation CT places a copy of the contents (an implicit parameter) of TWP 480 onto the top of the execution stack.

The Operation Move Top of the Stack (MT)

The operation MT removes the top item from the execution stack (an implicit parameter) and places it in TWP 480. This way the pointer to the top of the execution stack can be moved to point to an arbitrary location.

The Operation Copy (CY)

The operation CY makes a copy of the top item in the execution stack (an implicit parameter), and places it on top of the execution stack. As a result two identical items reside in the top two locations of the execution stack.

The Operation Add (ADD)

The operation Add (AD) removes two items (2 implicit paramters) from the top of the execution stack. The two items are added and the result is placed on top of the execution stack. This operation involves the use of an arithmetic unit which, as indicated hereinbefore, is an inherent part of unit 107.

The Operation Subtract (SU)

The operation SU removes two items (2 implicit parameters) from the top of the execution stack. The item that has resided on the top is subtracted from the other item and the result is placed on top of the execution stack. This operation involves the use of the arithmetic unit in unit 107 referred to above.

The Operation Test (TT)

The operation TT assumes that the two top items on the execution stack (2 implicit parameters) are the coded test condition, and the value to be tested. The two items are removed from the execution stack and the test is performed according to the condition encoded. The Boolean value (0, or 1) which will signify whether the test has failed or succeeded, is placed on the top of the execution stack.

The Operation Function (FN)

The operation FN applies to two or more items on the top of the execution stack ($n$ implicit parameters). The top item is a coded function, while one or more following items are the operands. The operation removes the function code, and subsequently the operands. The encoded function is performed, and its result (one or more items of information) are placed back on the execution stack. This operation involves the use of a function unit commonly found in present computers and located within unit 107 herein. The function unit itself is not an inherent part of the invention.

The Operation Escape (ESC)

The operation ESC is used to extend the number of available primary operations beyond the $2^k$, where $k$ is the number of bits allowed for an OP-code character ($k=4$ bits in the illustrative example presented hereinbefore). When the OP-code ESC is decoded, it signifies that the next program character (4 bits according to the illustrative example set out herein) is to be interpreted as a secondary operation code (an implicit parameter). The decoded secondary OP-code results in one of a plurality (16 for the 4 bit case) of hardware, microprogrammed, or elementary language execution sequences in the same manner that a decoded primary OP-code results in such as sequence. Three notes are in order with respect to ESC. First, the number of primary OP-codes serving the function of escape codes does not have to be limited to one. Second, the number of the decode levels need not have to be limited to two. Third, the decodable characters (the OP-code) within a single operation of the elementary language can be interspaced by parameters. ESC provides what has been referred to hereinbefore as an extended OP-code feature.

In conclusion, what has been presented above has been the detailed description of both apparatus and methods for supporting the process of interpretation and which taken together constitute an inherently microprogrammable high level language processor.

It should be noted that in addition to the elementary operations set out above constituting the set of instructions for the high level language processor, one may devise other instructions to suit the particular needs of the microprogrammer even after a machine design has been cast to support only a fixed number of elementary operations. In particular, the ESC operation described above permits this flexibility.

It should be further noted that in the description of the preferred embodiment references were made to instructions of an interpretable language string said instruction comprising program characters, said characters further comprising OP-codes and instructions The sequence of execution may be envisioned as a main elementary language program extracting and decoding an OP-code, and locating one of a plurality of elementary language routines represented by this OP-code. The elementary language routine performs its function which may include extraction of parameters associated with the OP-code, if any, and processing of these parameters. Upon completion of its task the routine returns to be main elementary language program which extracts, decodes the next OP-code and decodes the corresponding elementary language routine.

This method of the processing already constitutes a substantial departure from the prior art in that the instructions can be designed freely, to suit any processing task, with disregard to the memory word boundaries, and number and the length of parameters. Further, the processor described herein is inherently suitable to process said strings, since it contains the sequential extraction mechanisms in particular, and a set of elementary operations related to interpretation in general. The elementary operations have been contrasted hereinbefore with micro-instructions which are related to hardware level manipulations of data.

The above method of processing is further enhanced by noticing (1) that the OP-code need not be the only character that is decoded and (2) by permitting the parameters extracted and processed by the OP-code related elementary language programs to be decodable and in turn to lead to lower level elementary language programs. These program characters that are decodable, including the top level OP-codes, shall all be referred to hereinafter as machine level operation codes. It should be noted that just as a top level OP-code may define parameters of an instruction, a machine level operation code embedded in such an instruction, may define its own parameters. In turn, these parameters can be decodable characters. Thus, the invention permits complex embedding of interpretable language constructs, which on the level of the interpreting elementary language routines is reflected by these routines being organized into a data structure. This structure can be a complete or partial map of the structure of grammar of High Level Languages (HLL's) permitting the inherently microprogrammable HLL processor to execute interpretable language strings corresponding to arbitrary HLL's.

Finally, it should be noted that the invention described herein has been illustrated with reference to a particular embodiment. It is to be understood that many details used to facilitate the description of such a particular embodiment are chosen for convenience only and without limitations on the scope of the invention. Many other embodiments may be devised by those skilled in the art without departing from the scope and spirit of the invention. For example, as indicated above, a processor with 5 bits per elementary operation, could be designed. Furthermore, an associative memory scheme for the decoding of OP-codes may be used in preference to the linear decoding (indexing) scheme presented herein. Accordingly, the invention is intended to be limited only by the scope and spirit of the appended claims.

What is claimed is:

1. An inherently microprogrammable high level language processor which includes an electrical interconnection with a storage device for executing an interpretable language string stored in said storage device, wherein said string includes machine level operation codes, and for executing one of a plurality of elementary language programs stored in said storage device, each program being represented by a machine level operation code, comprising:
   a. first extration means for extracting a machine level operation code via said electrical interconnection from said interpretable language string stored in said storage device for use in locating the one of the elementary language programs stored in said storage device which is represented by the extracted code;
   b. second extraction means for extracting an elementary language operation code via said electrical interconnection from said one elementary language program stored in said storage device;
   c. decoding means for decoding the extracted elementary language operation code; and
   d. logic means connected to said decoding means for executing the elementary operation which is represented by the elementary language operation code.

2. A processor as set forth in claim 1 in which certain of said operation codes have parameters associated therewith, and in which said first extraction means is operable to extract said parameters.

3. Apparatus as set forth in claim 1 wherein said first extraction means further comprises:
   a. first register means for providing a word address and a bit address within said word which indicates the machine level operation code in said interpretable language string to be extracted;
   b. second register means for receiving via said electrical interconnection with said storage device the stored word uniquely identified by said word address; and
   c. means for outputting the machine level operation code from the word in said second register means.

4. Apparatus as set forth in claim 1 wherein said first extraction means further comprises:
   a. first register means for providing a word address and a bit address within said word which indicates the machine level operation code in said interpretable language string to be extracted;
   b. second register means for receiving via said electrical interconnection with said storage device the stored word uniquely identified by said word address;
   c. third register means connected to said second register means for receiving bits of the stored word from said second register means;
   d. first control means for controlling shifting of bits from said second register to said third register means;

5. A processor as set forth in claim 4 wherein said first register means further comprises:
   a. an $n + p$ bit register in which a first set of $n$ bits store the address of any one of said stored words, and a second set of $p$ bits which store the address of any bit within said stored word; and
   b. test for zero logic connected to said $p$ bits for signalling a requirements for transfer of a new word from storage into said second register means, said new word corresponding to the new word address represented by said one set of bits of said $n + p$ bit register which is generated whenever said set of $p$ bits pass through all zeros.

6. A processor as set forth in claim 4 wherein said first control means further comprises:
   a. an $x$ register in which $2^x$ is a maximum number of bits which may be shifted during any one sequential extraction; and
   b. test for zero logic connected to said $x$ bit register providing a signal to terminate shifting responsive to all $x$ bits being zero.

7. A processor as set forth in claim 1 wherein said first extraction means further comprises:
   a. a program character counter for providing a word address, and a bit address within said word which indicate the character in said interpretable language string to be extracted, and for further providing an indication of when a word needs to be transferred out of storage;
b. a first shift register, corresponding in length to the length of a word in storage, for receiving a word transferred from said storage device via said electrical interconnection, said transferred word being uniquely identified by the word address portion of said program character counter;
c. a second shift register corresponding in length to the length of a word in storage connected to said first shift register, for receiving from said first shift register bits that are left shifted;
d. bit counter means for controlling left shifting of bits from said first register to said second register;
e. control means for incrementing said bit address in said program character counter by one unit with each left shift and for decrementing said bit counter means by one unit for each left shift; and
f. means for retrieving from said second shift register the right adjusted program character extracted.

8. A processor as set forth in claim 1 in which certain of said elementary language codes have parameters associated therewith, and wherein said second means for extracting further comprises:
a. first register means for providing a word address which indicates an elementary language operation code to be extracted from said elementary language program;
b. second register means for receiving via said electrical interconnection with said storage device at least one stored word uniquely identified by said word address;
c. control means for outputting said elementary language operation code from said second register means and further register means for storing the parameters associated with said elementary language operation code as output from said second register means.

9. A process as set forth in claim 1 in which certain of said elementary language codes have parameters associated therewith and wherein said second means further comprises:
a. first register means for providing a word address, and a bit group address within said word which indicates an elementary language operation code to be extracted from said elementary language program;
b. second register means for receiving via said electrical interconnection with said storage device a first stored word uniquely identified by said word address;
c. third register means for receiving a second and further stored words, including means connected to said second register means for transferring bits of the words stored therein to said second register means;
d. first control means for controlling said shifting of groups of bits from said third register means to said second register means;
e. second control means for incrementing said bit group address in said first register means by one unit with each of said shifts;
f. means for outputting the elementary language operation code from said third register means; and
g. means for outputting parameters from at least said second and third register means.

10. In a processor as set forth in claim 9 wherein said first register means further comprises:
a. an $m + q$ bit register in which a first set of $m$ bits store the address of any one of said stored words, and a second set of $q$ bits which store the address of any bit group within said stored word; and
b. test for zero logic connected to said $q$ bits for signalling a requirement for transfer of a new word from storage into said second register means, said new word corresponding to the new word address represented by said one set of bits of said $m + q$ bit register which is generated whenever said set of $q$ bits pass through all zeros.

11. A processor as set forth in claim 9 wherein said first control means further comprises:
a. a $y$ bit register in which $2^y$ is the maximum number of groups which may be shifted during any one sequential extraction operation; and
b. test for zero logic connected to said $y$ bit register for providing a signal to terminate shifting responsive to all $x$ bits being zero.

12. A processor as set forth in claim 11 which includes an input circuit for said $y$ bit register, and first signal means for providing a first signal set to said input circuit from said logic means associated with elementary operations other than extraction, and second signal means for extracting from said interpretable language string.

13. A processor as set forth in claim 1 wherein said second means for extracting further comprises:
a. an elementary level program counter for providing a word address, and a bit group address within said word of the character in said string corresponding to said elementary language program to be extracted and for further providing an indication of when a word needs to be transferred out of said storage device;
b. a first shift register corresponding in length to the length of a word in storage, for receiving a word transferred from said storage device, said transferred word being uniquely identified by the word address portion provided by said elementary level program counter;
c. a second shift register corresponding in length to the length of a word in storage device, connected to said first shift register, for receiving from said first shift register groups of bits that are left shifted;
d. counter means for controlling left shifting of groups of bits from said first register to said second register;
e. control means for incrementing said bit group address in said elementary level program counter by one unit with each group of bits left shifted and for decrementing said counter means by one unit for each group of bits left shifted.
f. means for outputting from said second shifted; register to said means for decoding the left adjusted elementary language operation code;
g. means for sequentially extracting and right adjusting parameters associated with an elementary language operation code, said parameters being extracted from said first and second shift register.

14. A method for executing an interpretable language string and for executing one of a plurality of stored elementary language programs which is represented by a machine level code contained in said interpretable language string, comprising the steps of:

a. extracting a machine level operation code from said stored interpretable language string;
b. locating the stored elementary language program which is represented by the extracted code;
c. extracting an elementary language operation code from said elementary language program as located;
d. decoding the extracted elementary language operation code; and
e. executing the elementary operation which is represented by the elementary language operation code.

15. A method in accordance with claim 14 wherein said step of locating the stored elementary language program which is represented by the extracted code further comprises the steps of:
a. storing an address table with the characteristic that each entry in said table constitutes the starting address for an elementary language program;
b. indexing said table with said extracted code to be able to retrieve the starting address of the represented elementary language program;
c. retrieving said starting address; and
d. outputting said address for use in extracting the elementary language codes of said elementary language program as located.

16. A method for executing an interpretable language string and for executing one of a plurality of stored elementary language programs which is represented by a machine level code contained in said interpretable language string, comprising the steps of:
a. storing a word address and a bit address within said word in a first register which indicates the machine level operation code to be extracted from the interpretable language string;
b. storing the word which is identified by the word address in a second register;
c. extracting the machine level operation code from the stored word;
d. locating the stored elementary language program which is represented by the extracted machine level operation code;
e. extracting an elementary language operation code from said elementary language program as located;
f. decoding the extracted elementary language operation code; and
g. executing the elementary operation which is represented by the elementary language operation code.

17. A method for executing an interpretable language string and for executing one of a plurality of stored elementary language programs which is represented by a machine level code contained in said interpretable language string, comprising the steps of:
a. storing in a first register a word address and a bit address within said word which represents the machine level operation code to be extracted from said interpretable language string;
b. storing the word thus identified in a second register;
c. shifting bits of the stored word from said second register to a third register and simultaneously incrementing said bit address in said first register;
d. outputting the machine level operation code from said third register when a predetermined shift of said bits has occurred;
e. locating the stored elementary language program which is represented by the extracted machine level code;
f. extracting an elementary language operation code from said elementary language program as located;
g. decoding the extracted elementary language operation code; and
h. executing the elementary operation which is represented by the elementary language operation code.

18. A method as set forth in claim 17 in which the shift of a predetermined number of bits to output the machine level operation code includes the additional steps of storing a number which represents the number of bits in the word which is in said second register, and decrementing said number toward zero with each shift of bits to the third register, and providing a signal to initiate outputting of the bits in the third register when the number in the second register decreases to zero.

19. A method as set forth in claim 17 which includes the step of updating said stored word address in said first register whenever all of the bits in the second register are shifted to said third register, and transferring the new word represented by the updated address to said second register.

20. A method for executing an elementary language program comprising the steps of:
a. storing in a first register a word address and a bit group address within said word which identifies the elementary level operation code to be extracted from said program;
b. storing a first and second word in a second and third register respectively which words are uniquely identified by said word address;
c. shifting bit groups of the stored words in said second and third registers and simultaneously incrementing said bit group address in said first register;
d. outputting the elementary level operation code from the third register when a predetermmned shift of said bit groups has occurred;
e. decoding the extracted elementary language operation code; and
f. executing the elementary operation which is represented by the elementary language operation code.

21. A method for executing an elementary language program as set forth in claim 20 in which certain of said elementary operations have parameters associated therewith comprising the further steps of:
a. extracting said parameters from said second and third shift registers; and
storing said extracted parameters in a temporary register for further processing upon execution of the elementary operation.

22. A method for executing an interpretable language string and for executing one of a plurality of stored elementary programs which is represented by a machine level code contained in said interpretable language string, comprising the steps of:
a. storing said interpretable language strings in a memory;
b. addressing said interpretable language strings with a program character counter in such a way as to maintain in said counter the word address in said memory and the bit address within said word for the first bit of the program character sought to be extracted;
c. transferring the word addressed by said counter into a first shift register;
d. loading a bit counter with the bit address of the field to be extracted for the word transferred to said first shift register;
e. shifting left the bits of said transferred word from said first shift register into a second shift register by a number of bits corresponding to the value of the bit address loaded into said bit counter;
f. decrementing said bit counter with each left shift;
g. updating the word and bit address in said program character counter with each left shift by incrementing said bit address by one unit which in turn will cause the word address to be incremented by one unit whenever the bit address is indicative of a word boundary being transcended;
h. terminating shifting when the value within said bit counter reaches zero thereby leaving the character to be extracted left justified in said first shift register;
i. clearing said second shift register;
j. loading said bit counter with the number of bits to be extracted;
k. shifting left the bits in said first shift register while decrementing said bit counter by one unit for each left shift thereby separating the field to be extracted from said interpretable language string;
l. continuing said left shift operation until the count in said bit counter reaches zero indicating that the field to be extracted is separated and in said second shift register;
m. interrupting said left shifting whenever said first shift register becomes depleted as indicated by the bit trace in said program character counter passing through zero, to transfer the new word addressed by said program character counter to said first shift register;
n. restoring the left shifting procedure interrupted until said bit counter reaches zero;
o. transferring the separated right justified character from said second shift register to an auxiliary register for further processing;
p. storing an address table with the characteristic that each entry in said table constitutes the starting address for elementary language program;
q. indexing said table with the contents of said auxiliary register to be able to retrieve the starting address of the represented elementary language program;
r. retrieving said starting address; and
s. outputting said address for use in extracting the elementary language codes of said elementary language program as located;
t. storing in an elementary language character counter a word address and a bit group address within said word which identifies the elementary level operation code to be extracted from said program;
u. storing a first and second word in a third and fourth shift registers respectively, which words are identified by said word address;
v. shifting bit groups of the stored words in said third and fourth registers and simultaneously incrementing said bit group address in said elementary counter;
w. outputting the elementary level operation code from the fourth register when a predetermined shift of said bit groups has occured;
x. decoding the extracted elementary language operation code; and
y. executing the elementary operation which is represented by the elementary language operation code.

23. An inherently microprogrammable high level language processor which includes an electrical interconnection with a storage device for executing an interpretable language string stored in said storage device wherein said string includes machine level operation codes, for executing one of a plurality of elementary language programs stored in said storage device, each program being represented by a machine level operation code, and each program having elementary language codes certain of which having parameters associated therewith, said processor comprising:
a. first extraction means for extracting a machine level operation code via said electrical interconnection from said interpretable language string stored in said storage device for use in locating the one of the elementary language programs stored in said storage device which is represented by the extracted code, said first extraction means including a register;
b. second extraction means for extracting an elementary language operation code via said electrical interconnection from said one elementary language program stored in said storage device including means for extracting parameters associated with the extracted one of the elementary language operation codes; and
c. means connecting the parameters associated with the extracted one of said codes to said register in said first means for controlling a further machine level sequential extraction.

24. An inherently microprogrammable high level language processor which includes an electrical interconnection with a storage device for executing interpretable language string stored in said storage device wherein said string includes machine level operation codes, and for executing one of a plurality of elementary language programs stored in said storage device, each program being represented by a machine level operation code comprising:
a. first extraction means for extracting a machine level operation code via said electrical interconnection from said interpretable language string stored in said storage device for use in locating the one of the elementary language programs stored in said storage device which is represented by the extracted code; and
b. second extraction means for extracting an elementary language operation code via said electrical interconnection from said one elementary language program stored in said storage device for use in the execution of the elementary operation which is represented by the elementary language operation code.

25. A processor as set forth in claim 1 in which said first extraction means is operable to extract any character from said interpretable language string.

* * * * *